United States Patent [19]

Inoue et al.

[11] 4,307,440

[45] Dec. 22, 1981

[54] STABILIZED SWITCHING VOLTAGE REGULATOR COMPRISING MEANS FOR PREVENTING OVERLOADS DUE TO INITIAL SURGE CURRENTS

[75] Inventors: Takashi Inoue; Fumio Asano, both of Tokyo, Japan

[73] Assignee: Ricoh Company, Ltd., Tokyo, Japan

[21] Appl. No.: 106,802

[22] Filed: Dec. 26, 1979

[30] Foreign Application Priority Data

Dec. 27, 1978 [JP]  Japan .............................. 53-165025

[51] Int. Cl.³ .................... H02P 13/22; H02P 13/30
[52] U.S. Cl. .................................. 363/15; 323/266; 323/901; 363/23; 363/49
[58] Field of Search ................. 323/DIG. 1, 266, 267, 323/272, 282, 284, 285, 901; 363/15, 16, 22, 23, 49

[56] References Cited

U.S. PATENT DOCUMENTS

| | | | |
|---|---|---|---|
| 3,355,653 | 11/1967 | Paradissis | 363/49 |
| 3,678,368 | 7/1972 | Popp | 323/DIG. 1 |
| 3,909,702 | 9/1975 | Hart | 323/266 |
| 3,959,714 | 5/1976 | Mihelich | 323/DIG. 1 |
| 4,156,273 | 5/1979 | Sato | 323/901 |
| 4,195,335 | 3/1980 | Murakami et al. | 363/49 |
| 4,215,392 | 12/1978 | Rhoads | 363/49 |

FOREIGN PATENT DOCUMENTS 564627  8/1977  U.S.S.R. ........................ 323/DIG. 1

OTHER PUBLICATIONS

1972 IEEE Region Six (U.S. Western Region) Conference Record, San Diego, Calif., USA (Apr. 19-21, 1972), pp. 145-149.
Rev. Teleg. R. Electron. (Argentina), vol. 64, No. 757, pp. 20-24, (Jan. 1976).

*Primary Examiner*—William H. Beha, Jr.
*Attorney, Agent, or Firm*—David G. Alexander

[57] ABSTRACT

A switching voltage regulator (86) is controlled to produce a low output voltage when the power is first turned on and subsequently to produce a high output voltage after a predetermined length of time has elapsed, thereby eliminating overloads due to initial surge currents.

11 Claims, 15 Drawing Figures

STABILIZED SWITCHING VOLTAGE REGULATOR COMPRISING MEANS FOR PREVENTING OVERLOADS DUE TO INITIAL SURGE CURRENTS

BACKGROUND OF THE INVENTION

The present invention relates to a stabilized switching voltage regulator comprising improved means for preventing overloads due to initial surge currents.

A conventional switching voltage regulator comprises an electronic switch such as a transistor and a comparator for comparing the output voltage of the regulator with a reference voltage and turning off the switch when the output voltage exceeds a predetermined value. The output voltage is developed across a filter capacitor.

In order to minimize interaction between multiple loads operated from the regulator, it has been known to provide a plurality of regulated outputs. This is because a power surge through one load will affect the other loads. However, a plurality of regulated outputs require a disproportionate increase in circuitry and cost. For this reason, it has been known to provide a preliminary filter, power oscillator and transformer between the switch and comparator. Where the transformer has a plurality of secondary windings and a rectifier and filter is provided for each winding, the comparator is connected to receive the output voltage of one of the filters. This generally aleviates the need for a regulated output for each load.

However, since the power oscillator is designed to have sufficient capacity to drive several high powered loads, it tends to produce excess voltage due to transient surges when the voltage is first applied to the regulator, especially if one or more of the loads is drawing full power. This may cause one or more of the loads to burn out in addition to the switch in the regulator.

SUMMARY OF THE INVENTION

A switching voltage regulator apparatus embodying the present invention comprises a switching regulator and control means for controlling the switching regulator to initially regulate an output voltage thereof to a low value when an input voltage is first applied thereto and subsequently to control the switching regulator to regulate the output voltage to a high value. The control means is constructed to control the switching regulator to regulate the output voltage to the high value after a predetermined length of time has elapsed after the input voltage is applied thereto, or to control the switching regulator to regulate the output voltage to the high value after the output voltage reaches the low value. The switching regulator comprises a reference voltage source for producing a reference voltage, a switch element, a voltage divider for voltage dividing the output voltage and a comparator for turning the switch on when the voltage divided output voltage is lower than the reference voltage and turning the switch off when the voltage divided output voltage is higher than the reference voltage, the control means being constructed to initially control the voltage division ratio to a high value and subsequently to control the voltage division ratio to a low value. The control means comprises a control reference voltage source, a control comparator, an integrating circuit connected between the control reference voltage source and the control comparator, the control reference voltage source producing a control reference voltage when the input voltage is applied to the switching regulator, the control comparator controlling the switching regulator to regulate the output voltage to the low value when the output voltage is higher than the control reference voltage and controlling the switching regulator to regulate the output voltage to the high value when the output voltage is lower than the control reference voltage. A time constant of the integrating circuit is selected so that an output voltage of the integrating circuit increases slower than the output of the switching regulator.

In accordance with the present invention, a switching voltage regulator is controlled to produce a low output voltage when the power is first turned on and subsequently to produce a high output voltage after a predetermined length of time has elapsed, thereby eliminating overloads due to initial surge currents.

It is an object of the present invention to provide a stabilized switching voltage regulator apparatus comprising means for positively preventing overloads thereof.

It is another object of the present invention to provide a switching voltage regulator comprising means for bringing an output voltage thereof up to a predetermined value in two steps.

It is another object of the present invention to provide a generally improved switching regulator apparatus.

Other objects, together with the foregoing, are attained in the embodiments described in the following description and illustrated in the accompanying drawing.

DESCRIPTION OF THE PREFERRED EMBODIMENTS

While the switching voltage regulator of the present invention is susceptible of numerous physical embodiments, depending upon the environment and requirements of use, substantial numbers of the herein shown and described embodiments have been made, tested and used, and all have performed in an eminently satisfactory manner.

Figure 1:
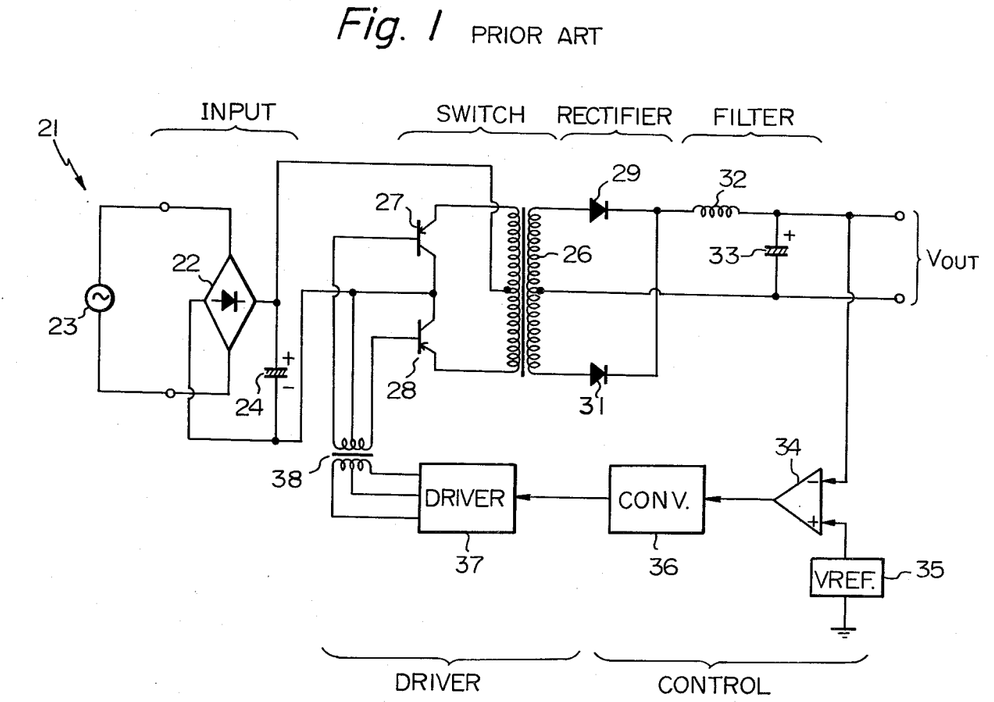
FIG. 1 is a simplified schematic diagram of a conventional switching voltage regulator.

Referring now to FIG. 1 of the drawing, a prior art switching voltage regulator apparatus is generally designated by the reference numeral 21 and comprises a rectifier 22 for rectifying A.C. power from a commercial source 23. A filter capacitor 24 is connected to the output of the rectifier 22 so that a positive smoothed D.C. voltage is developed at the upper end of the capacitor 24. The upper end of the capacitor 24 is connected to the center tap of a primary winding of a transformer 26. The lower end of the capacitor 24 is connected to the emitter of NPN switching transistors 27 and 28. The collectors of the transistors 27 and 28 are connected to the opposite ends of the primary winding of the transformer 26.

The opposite ends of the secondary winding of the transformer 26 are connected to the anodes of rectifier diodes 29 and 31 respectively. The cathodes of the diodes 29 and 31 are commonly connected through a filter coil 32 and capacitor 33 to the center tap of the secondary winding of the transformer 26. The output voltage of the regulator 21 appears at the junction of the coil 32 and capacitor 33 and is applied to an inverting input of a voltage comparator 34. A reference voltage VREF equal to the desired regulated output voltage of the regulator 21 is applied to the noninverting input of the comparator 34 from a source 35. The output of the comparator 34 is connected through a converter 36 and driver 37 to a driver transformer 38. The center tap of the secondary winding of the driver transformer 38 is connected to the collectors of the transistors 27 and 28 whereas the ends of the secondary winding of the driver transformer 38 are connected to the bases of the transistors 27 and 28 respectively.

The various components of the regulator 21 constitute an input section, a switch or chopper section, a rectifier section, a filter section, a control section and a driver section as illustrated.

In operation, the output of the source 23 is rectified by the rectifier 22 and smoothed by the capacitor 24 to produce a D.C. voltage across the capacitor 24. When the output voltage $V_{out}$ is lower than the reference voltage VREF, the comparator 34 produces a high output which energizes the driver 37 through the converter 36 to produce an A.C. or pulse voltage which is applied to the bases of the transistors 27 and 28 through the transformer 38. This causes the transistors 27 and 28 to be alternately turned on and off at the repetition frequency of the output of the driver 37 causing the voltage applied to the transformer 26 from the filter capacitor 24 to be alternately turned on and off. This produces a varying magnetic field in the primary winding of the transformer 26 which produces an induced alternating voltage in the secondary winding thereof. The alternating voltage in the secondary winding of the transformer 26 is rectified by the diodes 29 and 31 and smoothed by the coil 32 and capacitor 33 to produce the D.C. output voltage $V_{out}$.

When the output voltage $V_{out}$ is lower than the reference voltage VREF, the output of the comparator 34 is low and the driver 37 is turned off. The transistors 27 and 28 are turned off and no current flows through the transformer 26. Thus, the transformer 26 does not supply any further current to the capacitor 33.

When the transistors 27 and 28 are not driven from the driver 37, the output voltage $V_{out}$ will drop due to power consumption by a load (not shown) until it drops below the reference voltage VREF at which point the transistors 27 and 28 are again driven from the driver 37. When the transistors 27 and 28 are driven from the driver 37, the output voltage $V_{out}$ will increase until it reaches the reference value VREF. In this manner, the output voltage $V_{out}$ is regulated to the reference value VREF and oscillates above and below it by a small amount which is referred to as the ripple voltage.

The capacitors 24 and 33 have a high breakdown voltage and the output frequency of the driver 37 is on the order of 20 kHz. The converter 36 is required to convert the output of the comparator 34 into a pulse width or a frequency depending on the type of control effected by the driver 37. In the case of a separately excited control system, the converter 36 will be replaced by an oscillator. In a self-excited control system, the converter 34 will be provided with hysteresis and connected directly to the driver 37.

The regulator 21 provides only one output which can vary to a considerable extent due to transient current flow through multiple loads connected thereto such motors, solenoids, preamplifiers and the like. For this reason, an improved prior art system uses a power oscillator which provides a plurality of outputs. However, the power oscillator is designed to have a maximum output power greater than the requirements of the various loads during normal operation to accommodate high transient currents. For this reason, such a regulator tends to produce an excessive output voltage when the power is first applied thereto, causing damage to the various components of the regulator as well as to the loads.

Figure 2:
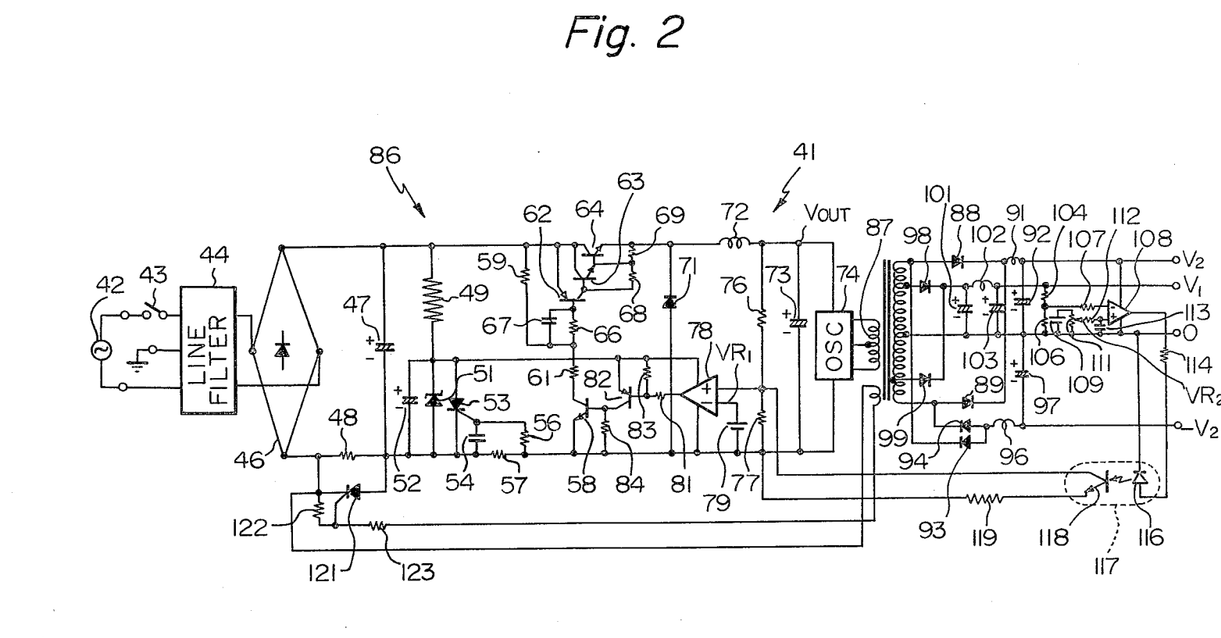
FIG. 2 is an electrical schematic diagram of a switching voltage regulator embodying the present invention.

An improved stabilized switching voltage regulator embodying the present invention is illustrated in FIG. 2 and designated as 41. An A.C. voltage from a commercial power source 42 is applied through a switch 43 and line noise filter 44 to a rectifier 46 which converts the output of the filter 44 to D.C. A filter capacitor 47 and current limiting resistor 48 are connected in series across the output of the rectifier 46. A regulated power supply comprising a resistor 49 and zener diode 51 is connected across the capacitor 47, with a filter capacitor 52 being connected across the zener diode 51. A thyristor in the form of a silicon controlled rectifier (SCR) 53 is connected across the zener diode 51. A capacitor 54 is connected between the anode and gate of the SCR 53. Resistors 56 and 57 are connected in series with each other and in parallel with the capacitor 54. The junction of the resistors 56 and 57 is connected to the emitter of an NPN transistor 58.

The positive (upper) end of the capacitor 47 is connected to the collector of the transistor 58 through resistors 59 and 61 and also to the emitter of a PNP transistor 62, the collector of an NPN transistor 63 and the collector of an NPN transistor 64. A resistor 66 and capacitor 67 are connected in parallel between the base of the transistor 62 and the junction of the resistors 59 and 61. The collector of the transistor 62 is connected to the base of the transistor 63 and also to the emitter of the transistor 64 through resistors 68 and 69. The emitter of the transistor 63 is connected to the base of the transistor 64 and also to the junction of the resistors 68 and 69.

The emitter of the transistor 64 is connected to the cathode of a flywheel or catch diode 71, the anode of which is connected to the emitter of the transistor 58. The emitter of the transistor 64 is also connected to the emitter of the transistor 58 through a filter coil 72 and filter capacitor 73. A power oscillator 74 which converts the voltage across the capacitor 73 into A.C. is connected across the capacitor 73. A voltage divider consisting of resistors 76 and 77 is connected across the capacitor 73. The junction of the resistors 76 and 77 is connected to a non-inverting input of a voltage comparator 78. The power supply terminals of the comparator 78 are connected across the zener diode 51 and resistor 57. A reference voltage source 79 applies a D.C. reference voltage VR1 to the inverting input of the comparator 78.

The output of the comparator 78 is connected through a resistor 81 to the base of a PNP transistor 82 which constitutes an inverter. A bias resistor 83 is connected between the emitter and base of the transistor 82. The emitter of the transistor 82 is connected to the cathode of the zener diode 51 whereas the collector of the transistor 82 is connected through a resistor 84 to the emitter of the transistor 58 and directly to the base of the transistor 58.

The components described thus far with the exception of the power oscillator 74 constitute a basic switching voltage regulator which is designated as 86 and operates as follows.

The power from the source 42 is passed through the filter 44 and rectifier 46 and converted to D.C. which charges the capacitor 47. The zener diode 51 and resistor 49 constitute a voltage regulator for supplying a stable supply voltage to the comparator 78. The transistors 62, 63 and 64 are series pass switching transistors which are connected in parallel to increase the current capacity and operate in an integral manner. In other words, all of the transistors 62, 63 and 64 are turned on at the same time and vice-versa. The catch diode 71 maintains current flow through the coil 72 to the capacitor 73 during the non-conduction periods of the switch transistors 62, 63 and 64 due to counter electromotive force. The capacitor 73 constitutes the output element of the regulator 86 and accumulates current applied thereto through the transistors 62, 63 and 64. The output voltage of the regulator 86 appears across the capacitor 73 and is designated as $V_{out}$. The voltage $V_{out}$ depends on the duty cycle of the transistors 62, 63 and 64, or the ratio of the on time to the off time, and increases as the duty cycle increases.

Where the desired output voltage $V_{out}$ has a value Vo', the relative values of the resistors 76 and 77 and the reference voltage VR1 are selected as follows.

$$Vo' = VR1 \times (R76 + R77)/R77 \qquad (1)$$

where R76 and R77 are the resistance values of the resistors 76 and 77 respectively. Thus, when the output voltage $V_{out}$ is equal to Vo', the voltage at the junction of the resistors 76 and 77 will be equal to the reference voltage VR1.

When the output voltage $V_{out}$ is less than Vo', the comparator 78 produces a low output which turns on the transistor 82 and thereby turns on the transistor 58. Conduction through the transistor 58 turns on the transistors 62, 63 and 64 which pass current to the capacitor 73 to charge the same and increase the output voltage $V_{out}$.

When the output voltage $V_{out}$ is greater than Vo', the comparator 78 produces a high output which turns off the transistor 82 and thereby turns off the transistors 58, 62, 63 and 64 thus blocking current flow to the capacitor 73. This causes the output voltage $V_{out}$ to decrease due to load current.

In this manner, the output voltage $V_{out}$ oscillates about Vo' to a small extent which is designated as the ripple voltage. However, in practical application the ripple voltage is quite small and the output voltage $V_{out}$ may be considered as stably regulated to Vo'.

The SCR 53 is provided to prevent excessive current flow to the load. In case of excess current flow through the regulator 86, the excess current will flow through the resistor 57 producing a large voltage drop. This large voltage drop appears at the gate of the SCR 53 causing the SCR 53 to conduct. This shorts out the zener diode 51 and de-activates the power supply to the comparator 78 and transistor 82. The transistor 58 is thereby turned off along with the transistors 62, 63 and 64 to prevent current flow to the capacitor 73 and load until the excessive current disappears. The resistor 56 and capacitor 54 constitute an integrating circuit to prevent the SCR 53 from being turned on by transient surrents of very brief duration.

The output of the power oscillator 74 is connected to the primary winding of a transformer 87. The ends of one secondary winding of the transformer 87 are connected to the anodes of diodes 88 and 89, the cathodes of which are connected through a filter coil 91 and filter capacitor 92 to the center tap of the secondary winding of the transformer 87. This recitifer and filter combination produces an output voltage V2 across the capacitor 92.

The ends of the secondary winding of the transformer 87 are also connected to the cathodes of diodes 93 and 94, the anodes of which are connected through a filter coil 96 and capacitor 97 to the center tap of the secondary winding of the transformer 87. This rectifier and filter arrangement produces a negative voltage $-$V2 across the capacitor 97.

Two opposite intermediate taps of the secondary winding of the transformer 87 are connected to the anodes of diodes 98 and 99, the cathodes of which are connected to the center tap of the secondary winding of the transformer 87 through a filter capacitor 101. A filter coil 102 and an additional filter capacitor 103 are connected across the capacitor 101. The voltage across the capacitor 103 is designated as V1. The voltages V1, V2 and $-$V2 are output voltages of the apparatus 41.

In accordance with an important feature of the present invention, a control voltage divider consisting of resistors 104 and 106 is connected across the capacitor 103. The junction of the resistors 104 and 106 is connected through a resistor 107 to the inverting input of a control comparator or amplifier 108. A control reference voltage VR2 is applied from a control reference voltage source 109 and adjustment potentiometer 111 through an integrating circuit consisting of a resistor 112 and capacitor 113 to the non-inverting input of the comparator 108.

The output of the comparator 108 is connected to the center tap of the transformer 87 through a current limiting resistor 114 and a light emitting diode (LED) 116 of an optocoupler 117. A phototransistor 118 of the optocoupler 117 is connected in series with a resistor 119 across the resistor 77. The comparator 108 is powered by the output voltage V2.

An SCR 121 is connected across the resistor 48. Resistors 122 and 123 are connected across a parasitic primary winding of the transformer 87. The resistor 122 is connected between the cathode and gate of the SCR 121.

The SCR 121 and resistor 48 function to limit current flow through the regulator 86 when the switch 43 is first closed to apply input power to the regulator 86. At 140 V peak line voltage, the initial charging current in the capacitor 73 approaches 100A. The output voltage of the oscillator 74 is initially zero, so that no gate voltage is applied to the SCR 121 and the SCR 121 is turned off. However, when the oscillator 74 produces a predetermined output voltage, this voltage is induced in the parasitic primary winding of the transformer 87 and applied to the gate of the SCR 121 to turn the same on and short out the resistor 48. In this manner, the resistor 48 limits current flow during the initial period after the switch 43 is closed and is then shorted out by the SCR 121 to prevent power loss.

The present apparatus 41 overcomes the drawbacks of the prior art by initially regulating the output voltage $V_{out}$ to the value Vo' which is typically 80-90% of a desired output voltage Vo. The voltages V1, V2 and −V2 are proportional to $V_{out}$. After a time T1 which is sufficient to prevent initial surge currents from producing an excessive output voltage, the regulator 86 is controlled to regulate the output voltage $V_{out}$ to Vo.

When the switch 43 is first closed to apply input power to the apparatus 41, the voltage $V_{out}$ is zero and the voltages V1, V2 and −V2 are also zero. The source 109 is turned on simultaneously with closing the switch 43 so that the reference voltage VR2 is applied to the capacitor 113 through the resistor 112 at the time the switch 43 is closed. Since V2 is zero, there is no power supply to the comparator 108 and the comparator 108 produces a low output. The low output of the comparator 108 does not light the LED 116 so that the phototransistor 118 is turned off and effectively disconnected from the resistor 77 along with the resistor 119. Thus, the output voltage $V_{out}$ is controlled to rise from zero to Vo'.

The time constant of the resistor 112 and capacitor 113 is selected so that the voltage across the capacitor 113, which is initially zero, rises slower than the voltage across the capacitor 103, which is V1. Thus, even when V2 is applied to the comparator 108 to power the same, the comparator 108 will continue to produce a low output until the time T1. This is in spite of the fact that the voltage V1 reaches a value proportional to Vo' at an earlier time T2.

The output of the comparator 108 will go high when the voltage across the capacitor 103 exceeds the voltage across the capacitor 103 at the time T1. When this occurs, the LED 116 will be turned on to therefore turn on the phototransistor 118. This has the effect of connecting the resistor 119 and phototransistor 118 in parallel with the resistor 77. At this time, the voltage division ratio of the voltage divider in the regulator 86 will be changed so that the output voltage $V_{out}$ will be regulated to the final desired value Vo in accordance with the following equation $$Vo = VR1 \times (R76 + R_E)/R_E \qquad (2)$$

where $R_E$ is the equivalent resistance of the combination of the resistors 77 and 119 and the phototransistor 118. Since $R_E$ is lower than R77, the voltage Vo is greater than Vo'. Thus, the output voltage has been increased from zero in two steps to Vo' and then to Vo, preventing excess output voltage from being produced by the apparatus 41.

Figure 3:
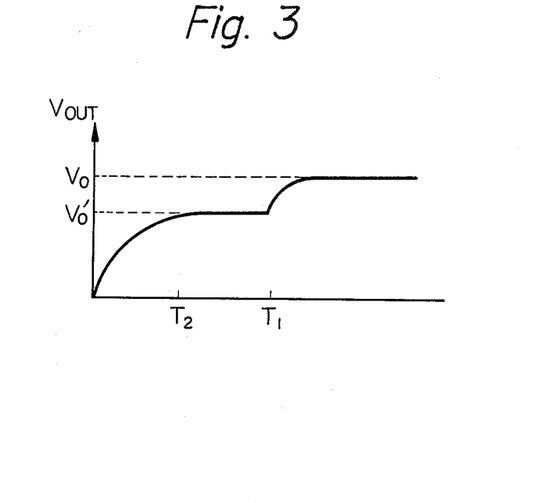
FIG. 3 is a graph illustrating the operation of the present switching regulator.

The voltage division ratio is hereby defined as being R77/(R77+R76) when the comparator 108 produces the low output and $R_E/(R_E+R76)$ when the comparator 108 produces the high output voltage. Since $R_E<R77$, the voltage division ratio is reduced when the comparator 108 produces the high output. This means that the output voltage $V_{out}$ has to increase to make the voltage divided fraction thereof equal to the reference voltage VR1. The operation of the present invention is illustrated in FIG. 3.

Figure 5:
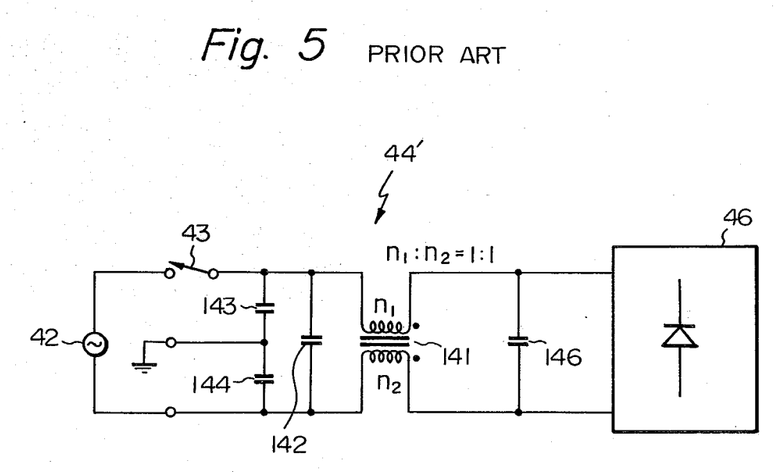
FIG. 5 is similar to FIG. 4 but shows a prior art noise filter.

FIG. 5 shows a conventional noise filter 44' which comprises a balanced transformer 141 having a unity turns ration n1:n2. A capacitor 142 is connected across the input of the transformer 141 in addition to a series combination of capacitors 143 and 144, the junction of which is grounded. Noise from the source 42 is rejected by the transformer 141 and a capacitor 146 connected across the output of the transformer 141. The transformer 141 is equivalent to two choke coils. Noise generated by the regulator 86 is rejected by the transformer 141 in combination with the capacitors 143 and 144. Common mode noise is rejected at the grounded junction of the capacitors 143 and 144.

Considerable levels of common mode noise may be generated by the regulator 86 and fed back toward the source 42 through the filter 44'. This noise may be reduced by increasing the inductance of the transformer 141 or the capacitance of the capacitors 143 and 144. However, an increase in the inductance of the transformer 141 must include an undesirable increase in the size of an iron core thereof. An iron core is provided to enable a reduction in the number of turns of the windings. Such a transformer 141 has the two windings connected to cancel magnetic flux induced in the iron core by load current and thereby prevent magnetic saturation. The capacitances of the capacitors 143 cannot be increased to a substantial extent due to leakage currents.

Figure 4:
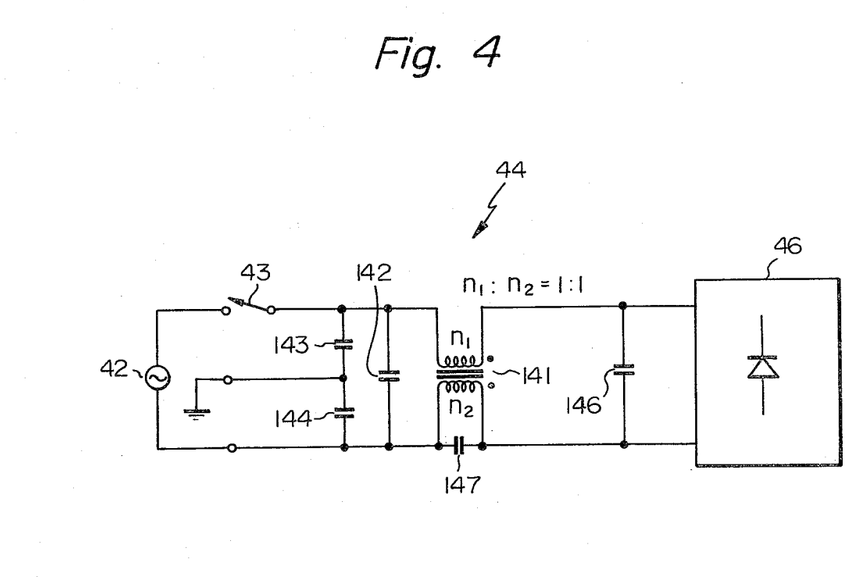
FIG. 4 is an electrical schematic diagram of a noise filter of the present invention.

This problem is overcome in accordance with the present invention by the filter 44 illustrated in FIG. 4, in which like elements are designated by the same reference numerals. A capacitor 147 is connected across one of the windings of the transformer 141 and has a capacitance such as to form a resonant circuit with the winding at a particular frequency. This frequency is the frequency of noise generated by the regulator 86, and designated as Fr in the following equation $$Fr = \frac{1}{\sqrt{2\pi LC147}} \qquad (3)$$

where C147 is the capacitance of the capacitor 147 and L is the inductance of the winding of the transformer 141 across which the capacitor 147 is connected. This arrangement has been found to be very effective in absorbing noise from the regulator 86, even if the junction of the capacitors 143 and 144 is not grounded.

Figure 6:
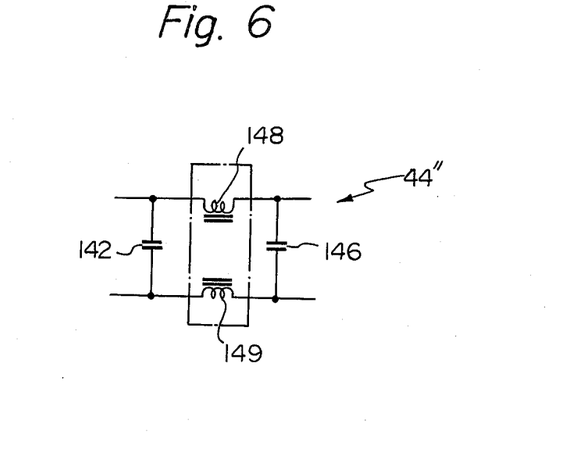
FIG. 6 is a partial schematic diagram illustrating an alternative arrangement of a noise filter.

FIG. 6 shows another noise filter 44" in which the transformer 141 is replaced by two coils 148 and 149.

In order to protect the loads powered by the regulator apparatus 141, it is desirable to disconnect the apparatus 141 from the load when the output voltage is below a predetermined value. This is accomplished by circuitry illustrated in FIG. 7 in block form. The power source 42 is connected through a regulator here designated as 151 and a switch 152 to a load to produce the voltage V1. The switch 152 is operated by a switch driver 153 so as to be opened for a predetermined length of time after the input power is applied. This is accomplished by a delay 154 and OR gate 156 connected to the driver 153. A control unit 157 senses the output voltage V1 and controls the regulator 151 in accordance therewith as described above.

Figure 7:
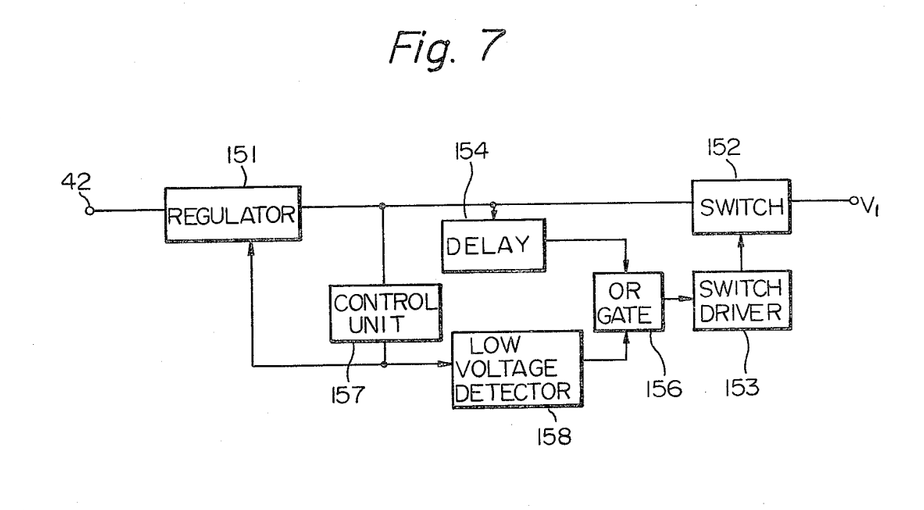
FIG. 7 is a block diagram of means for preventing a drop in output voltage from the regulator.

A low voltage detector 158 is connected to the control unit 157 and controls the driver 153 through the OR gate 156 to open the switch 152 when the voltage V1 is below a predetermined value.

Figure 8:
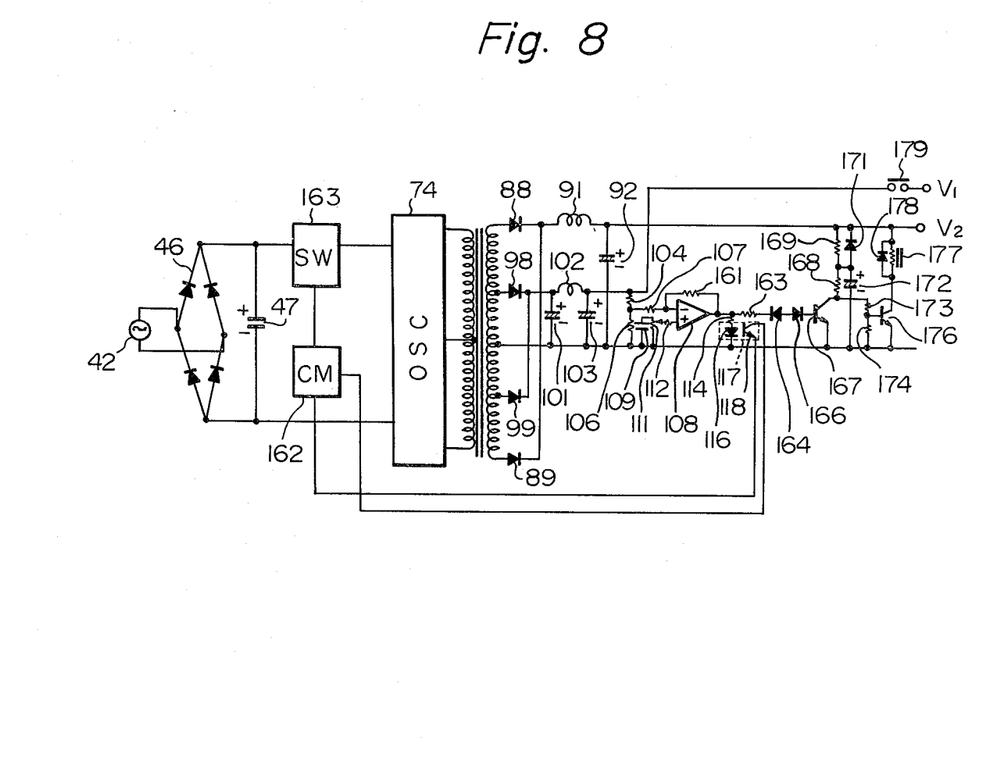
FIG. 8 is an electrical schematic diagram of another switching regulator of the present invention comprising the means of FIG. 7.

A more detailed arrangement is shown in FIG. 8 in which like elements are designated by the same reference numerals. It will be noted that the capacitor 113 is omitted and a feedback resistor 161 is connected between the output and non-inverting input of the amplifier 108, converting the amplifier 108 into a differential amplifier configuration. The output of the amplifier 108 will be high when the voltage V1 is low and vice-versa. This is opposite to the operation of the apparatus 141. The phototransistor 118 is connected to a comparator 162 which controls a switch 163. The comparator 162 controls the output voltage to the low value when the phototransistor 118 is turned on and vice-versa.

The output of the amplifier 108 is connected through a resistor 163 to the cathode of a zener diode 164. The anode of the zener diode 164 is connected to the anode of a diode 166, the cathode of which is connected to the base of an NPN transistor 167 having an emitter connected to the cathode of the LED 116.

The collector of the transistor 167 is connected through resistors 168 and 169 to the voltage V2. A diode 171 is connected across the resistor 169 whereas the junction of the resistors 168 and 169 is connected through a capacitor 172 to the emitter of the transistor 167.

The collector of the transistor 167 is connected to the emitter thereof through resistors 173 and 174, the junction of which is connected to the base of an NPN transistor 176, the emitter of the transistor 176 being connected to the emitter of the transistor 167. The collector of the transistor 176 is connected to the voltage V2 through a relay coil 177. A diode 178 is connected across the coil 177. The coil 177, when energized, closes relay contacts 179 connected between the capacitor 103 and a load (not shown).

The control unit 157 of FIG. 7 is constituted by the amplifier 108 and optocoupler 117. The low voltage detector is constituted by the zener diode 164. The delay 154 is constituted by the resistors 168 and 169 and capacitor 172. The driver 153 is constituted by the transistor 176 and coil 177 whereas the switch 152 constituted by the contacts 179.

When the power is first applied, V2 is zero and the capacitor 172 is completely discharged. Thus, the voltage at the base of the transistor 176 is zero and the coil 177 is de-energized to open the contacts 179. The capacitor 172 charges through the resistor 169 in a length of time depending on the time constant. At a certain point the voltage across the capacitor 172 will be great enough to turn on the transistor 176 and thereby energize the coil 177 to close the contacts 179.

No current will flow through the zener diode 164 and base of the transistor 167 while the voltage V1 is above a predetermined level determined by the zener voltage of the diode 164 and the base-emitter drop of the transistor 167. This condition is maintained when the voltage V1 is high since the output of the amplifier 108 is low or negative.

However, when the voltage V1 drops below the predetermined level, the output voltage of the amplifier 108 exceeds the zener voltage of the diode 164 and base current flows through the transistor 167 turning the same on. This connects the base of the transistor 176 to the low voltage reference and turns off the transistor 176. This causes the coil 177 to be de-energized and the contacts 179 to open.

Assuming that R107>R104, R107>R106 and R161>R107, where R104, R106, R107 and R161 are the resistance values of the resistors 104, 106, 107 and 161 respectively, a change ΔV1 in the output voltage V1 produces a change ΔV1′ in an output voltage V1′ of the amplifier 108 as follows $$\Delta V1' \approx \frac{R106}{R104 + R106} \times \frac{R161}{R107} \times \Delta V1 \qquad (4)$$

The resistors 104 and 106 are selected so that ΔV1′>V1. In other words, the amplifier 108 produces an amplified version of any changes in the output voltage V1. Where the voltages V1 and V1′ have steady state values V1s and V1s′, the output of the amplifier 108 is $$V1' \approx V1s' + \Delta V1' \qquad (5)$$
$$\approx V1s' + \frac{R106}{R104 + R106} \times \frac{R161}{R107} \times \Delta V1$$

Since the circuitry functions to sense an amplified version of the output voltage V1, errors due to variations in the zener voltage of the zener diode 164 are reduced to a negligible level.

It is also desirable to prevent excess current or voltage from being applied to the load. Prior art means for detecting such excess are illustrated in FIGS. 9 and 10.

Figure 9:
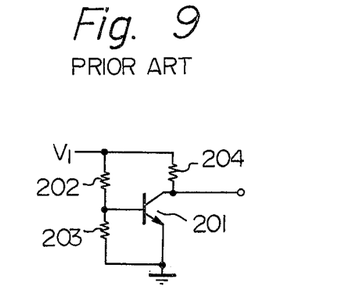
FIGS. 9 and 10 are electrical schematic diagrams illustrating prior art means for detecting excessive output current.
Figure 10:
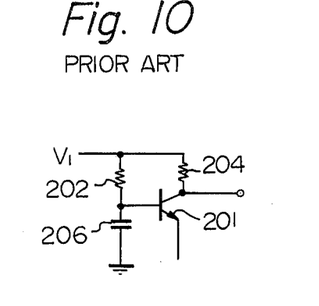

In FIG. 9, the voltage V1 is applied to the base of an NPN transistor 201 via a voltage divider consisting or resistors 202 and 203 and also to the collector of the transistor 201 through a resistor 204. The resistors 202, 203 and 204 bias the transistor 201 in such a manner that the collector voltage of the transistor 201 will change state when the voltage V1 crosses a predetermined value. A similar circuit is shown in FIG. 10 in which the resistor 203 is replaced by a capacitor 206 to reject transients of short duration. These prior art circuits are generally unstable.

Figure 11:
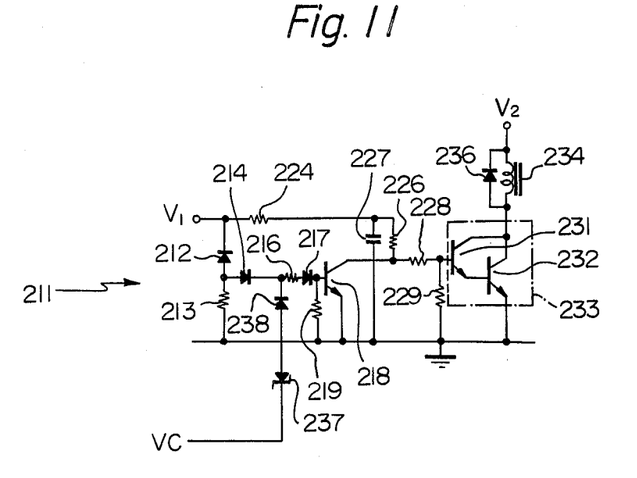
FIGS. 11 and 12 are electrical schematic diagrams illustrating means embodying the present invention for detecting excessive output current.

An improved excess current or voltage detector is shown in FIG. 11 and designated as 211. The voltage V1 is applied to the cathode of a zener diode 212, the anode of which is grounded through a resistor 213. The anode of the zener diode 212 is also connected to the anode of a diode 214, the anode of which is connected through a resistor 216 to the anode of a diode 217. The cathode of the diode 217 is connected to the base of an NPN transistor 218, the emitter of which is grounded. The base of the transistor 218 is also grounded through a resistor 219.

Figure 13:
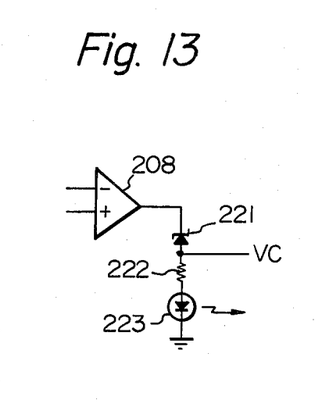
FIG. 13 is an electrical schematic diagram illustrating a modification to FIGS. 11 and 12.

As illustrated in FIG. 13, the output of the amplifier 208 is shown as being connected to the cathode of a zener diode 221, the anode of which is connected to ground through a resistor 222 and LED 223. The luminous output of the LED 223 is used in an optocoupler arrangement to control the regulator arrangement of FIG. 8, although not explicitly illustrated. A control signal VC appears at the anode of the diode 221 and is high when the voltage V1 is below a value corresponding to Vo' and vice-versa.

Figure 14:
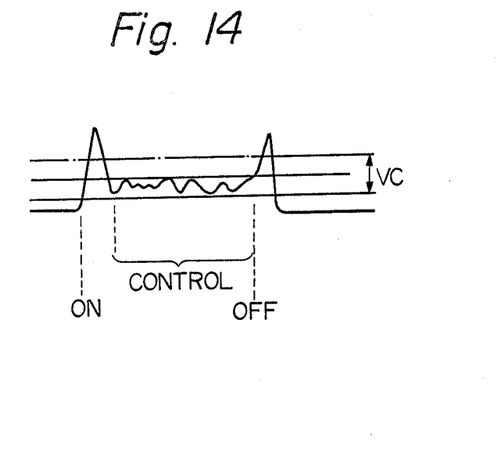
FIG. 14 is a graph illustrating the operation of the circuits of FIGS. 11 to 13.

FIG. 14 shows that the voltage VC is high when the power is first turned and goes low when V1 corresponds to Vo' in a control range. VC goes high again temporarily when the power is turned off until V2 goes low and de-energizes the amplifier 108.

The voltage V1 is applied to the collector of the transistor 218 through resistors 224 and 226. The junction of the resistors 224 and 226 is connected to ground through a capacitor 227. The collector of the transistor 218 is connected to ground through resistors 228 and 229. The junction of the resistors 228 and 229 is connected to the base of an NPN transistor 231. The emitter of the transistor 231 is connected to the base of an NPN transistor 232, the emitter of which is grounded. The collectors of the transistors 231 and 232 are connected together to constitute a Darlington transistor 233. The collectors of the transistors 231 and 232 are connected to V2 through a relay coil 234 which controls contacts (not shown) to disconnect the output voltage V1 from the load when energized. A diode 236 is connected across the coil 234.

The signal VC is applied to the cathode of a zener diode 237, the anode of which is connected to the anode of a diode 238. The cathode of the diode 238 is connected to the cathode of the diode 214.

The signal VC will turn on the transistor 218 when the level thereof is higher than the sum of the zener voltage of the zener diode 237 and the drop across the diode 238. This connects the base of the transistor 231 to ground and turns off the transistors 231 and 232 to de-energize the coil 234 and disconnect the load from the voltage V1. The diode 238 is a reverse blocking diode. The zener diode 237 functions as a level shifter. It will be noted that the diodes 124 and 217 also function as reverse blocking diodes and are not required, in addition to the diode 238, when the voltage VC is not applied to the circuit 211.

When the power is first turned on, the voltage across the capacitor 227, which is initially zero, rises in accordance with the time constant of the resistor 224 and capacitor 227 in combination. The initially low voltage across the capacitor 227 applied to the base of the transistor 231 turns off the transistors 231 and 232. The voltage across the capacitor 277 rises to a great enough level to enable the transistors 231 and 232 to be turned on after a predetermined length of time depending on the time constant.

When the voltage V1 is below a predetermined level depending on the zener voltage of the diode 212, the diode 212 does not pass current and the transistor 218 is turned off. The transistors 231 and 232 are turned on by the high voltage, typically +4.5 V, across the capacitor 217 applied through the resistors 226 and 228. However, when the voltage V1 exceeds the predetermined value, current flows through the zener diode 212 and the base of the transistor 218 turning the transistor 218 on. This grounds the transistors 231 and 232 turning the same off and disconnecting the voltage V1 from the load.

Figure 12:
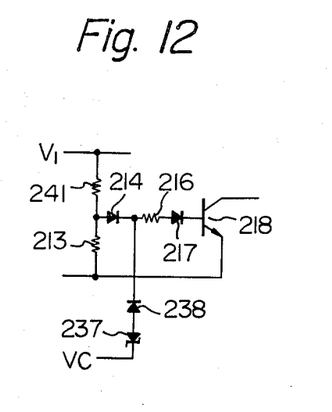

FIG. 12 is similar to FIG. 11 except that the zener diode 212 is replaced by a resistor 241. The transistor 218 will conduct when the voltage V1 exceeds a predetermined value determined by the bias voltage applied to the transistor 218.

Figure 15:
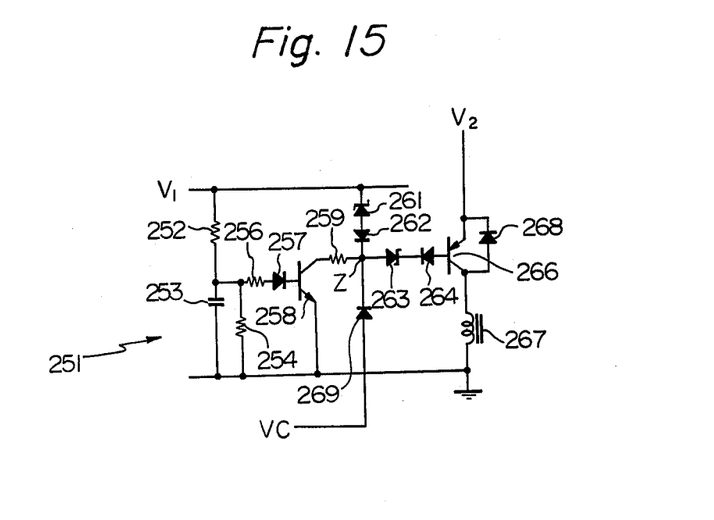
FIG. 15 is an electrical schematic diagram illustrating another alternative to the circuitry of FIGS. 11 and 12.

Another circuit 251 is shown in FIG. 15 to prevent excess current or voltage from being applied to the load. The voltage V1 is applied through a resistor 252 to a capacitor 253 which is grounded. The voltage across the capacitor 253 is fed through a resistor 253 is fed through a resistor 256 to the anode of a diode 257, the cathode of which is connected to the base of an NPN transistor 258. The junction of the resistor 252 and capacitor 253 is grounded through a resistor 254 to provide a discharge path for the capacitor 253 when the power is turned off.

The emitter of the transistor 258 is grounded, and the collector thereof is connected through a resistor 259 to the anode of a zener diode 263 and also to the cathode of a diode 262. The anode of the diode 262 is connected to the anode of a zener diode 261, the cathode of which is connected to the voltage V1.

The voltage VC is applied to the anode of a diode 269, the cathode of which is connected to the anode of the zener diode 263. The cathode of the diode 263 is connected to the cathode of a diode 264, the anode of which is connected to the base of a PNP transistor 266. The emitter of the transistor 266 is connected to the voltage V2. The collector of the transistor 266 is grounded through a relay coil 267 which disconnects the voltage V1 from a load when energized. A diode 268 is connected across the transistor 266.

When the power is first turned on or when the voltage V1 is below a predetermined value for some other reason, the voltage across the capacitor 253 is low and turns off the transistor 258. This disconnects a point Z and thereby the base of the transistor 266 from ground and turns off the transistor 266 to prevent current flow through the coil 267. When the voltage across the capacitor 253 reaches the predetermined value, the transistor 258 is turned on connecting the base of the transistor 266 to ground through the diode 264, zener diode (forward biased) 263 and resistor 259. This turns on the transistor 266 and allows the coil 267 to be energized.

The voltage at the point Z is normally equal to the voltage V2 minus the emitter-base voltage drop of the transistor 266, the drop across the diode 264 and the zener voltage of the diode 263. When the voltage V1 exceeds this value by an extent equal to the zener voltage of the diode 262 and the voltage drop across the diode 262, the transistor 266 will be turned off to de-energize the coil 267. The same action will occur when the voltage of the signal VC exceeds the normal voltage at the point Z.

In summary, it will be seen that the present invention provides a stabilized switching voltage regulator which is fully protected against excessive or insufficient voltages and currents. Various modifications will become possible for those skilled in the art after receiving the teachings of the present disclosure without departing from the scope thereof.

What is claimed is:

1. A switching voltage regulator apparatus comprising a switching voltage regulator and control means for controlling the regulator to initially regulate an output voltage thereof to a predetermined discrete low value when an input voltage is first applied thereto and subsequently to control the regulator to regulate the output voltage to a predetermined discrete high value.

2. An apparatus as in claim 1, in which the control means is constructed to control the regulator to regulate the output voltage to the high value after a predetermined length of time has elapsed after the input voltage is applied thereto.

3. An apparatus as in claim 1, in which the control means is constructed to control the regulator to regulate the output voltage to the high value after the output voltage reaches the low value.

4. An apparatus as in claim 2 or 3, in which the regulator comprises a reference voltage source for producing a reference voltage, a power switch element, a voltage divider for voltage dividing the output voltage and a comparator for turning the switch element on when the voltage divided output voltage is lower than the reference voltage and turning the switch element off when the voltage divided output voltage is higher than the reference voltage, the control means being constructed to vary a voltage division ratio of the voltage divider.

5. An apparatus as in claim 4, in which the control means is constructed to initially control the voltage division ratio to a high value and subsequently to control the voltage division ratio to a low value.

6. An apparatus as in claim 1, in which the control means comprises a control reference voltage source, a control comparator, an integrating circuit connected between the control reference voltage source and the control comparator, the control reference voltage source producing a control reference voltage when the input voltage is applied to the regulator, the control comparator controlling the regulator to regulate the output voltage to the low value when the output voltage is higher than the control reference voltage and controlling the regulator to regulate the output voltage to the high value when the output voltage is lower than the control reference voltage.

7. An apparatus as in claim 6, in which a time constant of the integrating circuit is selected so that an output voltage of the integrating circuit increases slower than the output of the regulator.

8. An apparatus as in claim 6, further comprising an optocoupler for connecting an output of the control comparator to the regulator.

9. An apparatus as in claim 1, in which the regulator further comprises a power oscillator and rectifier means for producing a plurality of output voltages, said output voltage being one of said plurality of output voltages.

10. An apparatus as in claim 9, in which the regulator further comprises a transformer connected between the power oscillator and rectifier means.

11. An apparatus as in claim 1, in which the regulator comprises a power switch element, a resistor connected in such a manner that input current to the switch element passes therethrough and means for turning off the switch element when a voltage across the resistor exceeds a predetermined value.

* * * * *